UNITED STATES PATENT OFFICE.

PETER G. SMITH, OF ROSLYN, AND JACOB J. JOHNSON, OF HUNTINGTON, NEW YORK.

IMPROVEMENT IN THE MANUFACTURE OF ARTIFICIAL LEATHER.

Specification forming part of Letters Patent No. 183,819, dated October 31, 1876; application filed September 8, 1876.

*To all whom it may concern:*

Be it known that we, PETER G. SMITH, of Roslyn, county of Queens, and JACOB J. JOHNSON, of Huntington, county of Suffolk, respectively in the State of New York, have invented certain new and useful Improvements in the Manufacture of Artificial Leather, of which the following is a full, clear, and exact description:

The object of our invention is to produce an artificial leather from a union of animal and vegetable matter which shall more nearly resemble the natural product in several of its characteristics, and be cheaper, firmer, and more pliable, and better adapted for certain uses than any artificial leather heretofore known to us; to accomplish which it (the invention) consists in certain manipulations of the stock or processes of preparing the same, and in certain combinations of ingredients, as will be hereinafter particularly described, and then pointed out in the claims.

We first reduce leather refuse, or chips and cuttings of tanned leather, to a pulpy state by subjecting it to the action of a mixture of sulphuric acid, pyroligneous acid, of about the strength known as seventy-grain vinegar, and fusel-oil, or oil of whisky, by which a thorough disintegration of the mass is accomplished, after which the surplus liquor should be drawn off, and may be preserved for a second or future operations. Rags and paper-stock, of whatever nature, are next ground and reduced to pulp by any of the known processes. For mixing with these, a third compound is produced by heating oak-bark (preferably the red oak) with vinegar, and mixing therewith a quantity of melted bees-wax.

The leather refuse, the paper-stock, and the mixture of bees-wax and oak-bark are now thoroughly mixed and stirred together, and the surplus liquor drawn off. The resulting mixture is then steamed, which may be accomplished by introducing steam-jets at the bottom of the vat in any well-known manner, after which the mass should be dried sufficiently to admit of its being ground.

The dried product is ground up finely, by which lumps remaining after the previous steps are completely reduced, and the material thus prepared is again steamed, after which it is passed through sieves, to remove any remaining lumps and to facilitate the evaporation of moisture. From the sieves the compound is run under presses, where it is reduced to the proper thickness, and thence to rollers and hammers, under which its density is increased to any required degree.

The proportion of ingredients employed is substantially as follows: One thousand pounds leather stock; three hundred pounds rags; three hundred pounds paper; sixty pounds sulphuric acid; eighty gallons pyroligneous acid; twenty gallons fusel-oil; one hundred and twenty-five pounds bees-wax; one hundred pounds oak-bark.

The bees-wax acts to give flexibility to the mass, which may be varied by varying the quantity used. It also operates to render the same water-proof, and assists in the thorough union of the several ingredients.

The oak-bark adds to the stock, and, at the same time, gives a color to the material which nearly resembles that of the natural leather when tanned.

The proportions of materials above enumerated are not invariable, but are about those preferred by us as giving the best results.

It will be observed that the article thus produced is comparatively without fiber and grain, and is therefore well adapted for uses to which *papier-maché* is ordinarily applied. It is susceptible of being polished to a high degree, and may be colored either by mixing coloring material with the ingredients specified, or by painting, &c. These qualities render the material serviceable in the ornamentation of furniture and wood-work generally, the lighter parts of which it may replace.

We contemplate employing our improved artificial leather in any situation where desirable, and mention, as some of the most obvious uses to which it is fitted, the following: the manufacture of oil-cloths, barrels, pails, book-covers, chair-seats, veneers, and insoles for shoes.

Having now fully described our invention, what we claim as new, and desire to secure by Letters Patent, is—

1. The process herein described of dissolving leather refuse for use in the manufacture of artificial leather, by treating the same with sulphuric acid, pyroligneous acid, and fusel-oil, in the manner and in about the proportions indicated.

2. The process herein described of introducing wax into the composition of artificial leather, for the purpose of rendering the material pliable and water-proof—viz., by first mixing the melted wax with the dissolved paper-stock, and then the resulting mixture with the dissolved leather refuse, as explained.

3. The process herein described of preparing the stock for artificial leather—viz., dissolving the leather refuse by the agents named; preparing the paper-stock by adding thereto the wax and coloring matter, in the manner set forth; mixing the two preparations; drying the mixture; grinding, steaming, sieving, and pressing, as explained.

In testimony that we claim the foregoing we have hereunto set our hands in the presence of two witnesses.

PETER G. SMITH.
JACOB J. JOHNSON.

Witnesses:
C. W. CARTAR,
EDGAR WEEKS.